United States Patent [19]

Hume

[11] Patent Number: 5,413,537
[45] Date of Patent: May 9, 1995

[54] POSITIVE DRIVE SYSTEM

[76] Inventor: Daniel A. Hume, 1292 Boonesborough Rd., Lot 84, Richmond, Ky. 40475

[21] Appl. No.: 271,489

[22] Filed: Jul. 7, 1994

[51] Int. Cl.⁶ .............................................. F16H 7/06
[52] U.S. Cl. .................................................. 474/154
[58] Field of Search ................................. 474/152–154

[56] References Cited
U.S. PATENT DOCUMENTS
4,214,488  7/1980  Conrad ........................... 474/154 X

Primary Examiner—Michael Powell Buiz
Attorney, Agent, or Firm—Walter F. Wessendorf, Jr.

[57] ABSTRACT

A positive drive system has drive and driven sprockets, coupled by a chain. The chain is trained around and operatively engages the drive and driven sprockets to transmit positive drive therebetween. The drive and driven sprockets have infinite relative planes of rotation ranging from 0 to 360 degrees.

2 Claims, 9 Drawing Sheets

POSITIVE DRIVE SYSTEM

BACKGROUND

1. Technical Field

This invention relates to a positive drive system.

2. Background

The problem in the art to which this invention apertains is the need for a positive drive system, utilizing drive transmitting means, such as a chain, for coupling a drive sprocket with driven sprockets. The chain is trained around and operatively engages the drive and driven sprockets to transmit positive drive to the driven sprockets. In order to accommodate spatial necessity, there is a further need, because the drive and driven sprockets have their own planes of rotation, for disposition of the drive and driven sprockets in infinite relative planes of rotation ranging from 0 to 360 degrees, and for disposition of succeeding driven sprockets in infinite relative planes of rotation ranging from 0 to 360 degrees. There is a further need that the assembled chain, trained around and operatively engaging the drive and driven sprockets, have means to effect its adjustment, but also, per se, incorporate vernier adjustment to "fine tune" the chain to afford not only length adjustment of the link assembly of the chain, but also for purposes of counter adjustment. Hence, the positive drive system of this invention is suitable for drive applications, ranging from light duty to heavy duty, and inclusively, high torque applications, high load capabilities, and with wear not only at a minimum but also, in the event of consequent minimal wear, such wear is correctable through vernier adjustment and counter adjustment of the chain, per se.

SUMMARY OF THE INVENTION

This invention contributes to the solutions of the discussed problems and needs of the art by providing a positive drive system that incorporates a chain, and drive and driven sprockets. The chain has sets of shell halves and link assemblies. Each set of shell halves is symmetrical and is joined together. Adjacent sets are operatively connected by a link assembly. Each link assembly has two aligned spheres. Each sprocket has valleys and ridges, with slopes being the surface between which each valley ends and each ridge begins. The sets complementally engage the valleys and ridges. The sprockets have their own planes of rotation. The chain, together with the sprockets, allow disposition of the sprockets in infinite relative planes of rotation ranging from 0 to 360 degrees.

BRIEF DESCRIPTION OF THE DRAWINGS

These objects and other objects of the invention should be discerned and appreciated by the "DETAILED DESCRIPTION OF THE PREFERRED EMBODIMENT" taken in conjunction with the drawings, wherein like reference numerals refer to similar elements throughout the several views, in which.

DETAILED DESCRIPTION OF THE PREFERRED EMBODIMENT

Figure 1:
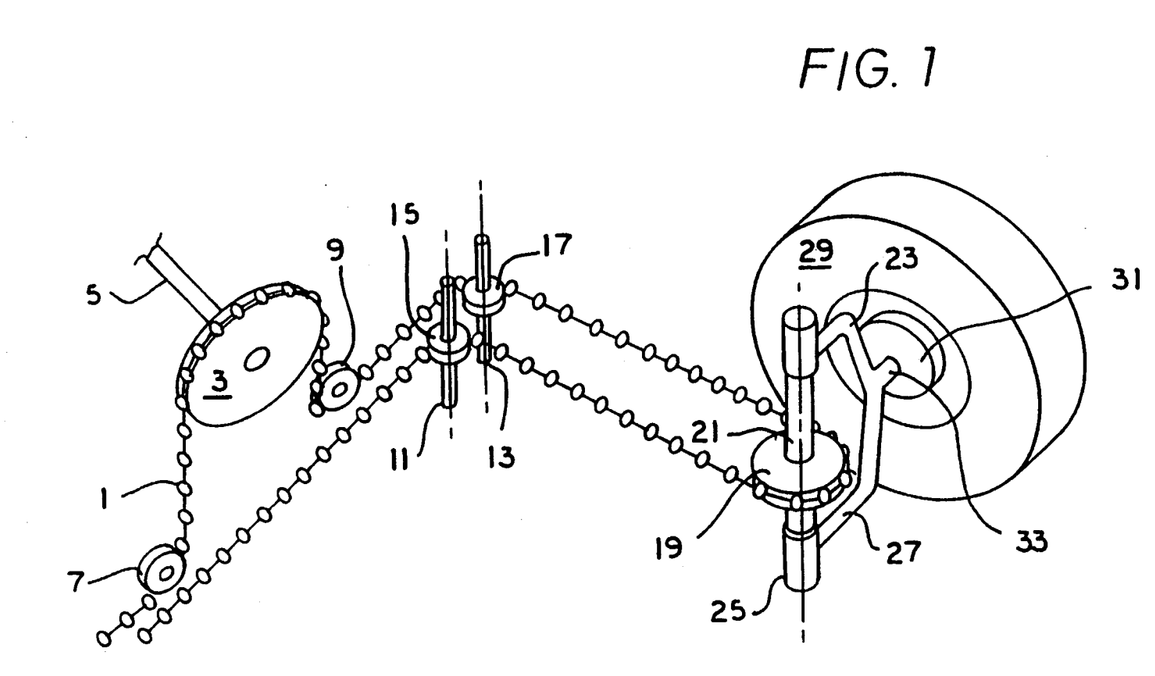
FIG. 1 is a representational view, in perspective, showing an application of the invention for the steering mechanism of an automobile.

FIG. 1 is a representational view, in perspective, of a steering mechanism for an automobile (not shown), employing a chain 1, trained around and operatively engaging a drive sprocket 3, fixed to a steering shaft 5, to which corresponding rotary motion is imparted by rotary movement of a conventional steering wheel (not shown). Separate shafts (not shown) freely mount their respective idler sprockets 7 and 9 which are co-planar with drive sprocket 3, and change the directional orientation, and hence movements of the chain 1. Idler shafts 11 and 13 freely mount repective idler sprockets 15 and 17, and change thereby the spatial orientation, and hence movements of the chain 1. A slave sprocket 19 is fixed to a slave shaft 21 which has portions 23 which are of a slightly greater diameter. A wheel fork 25 is fixed to the slave-shaft 21 portions 23 at its forwardly projected transverse ends 27. A wheel 29 is fixedly mounted on a wheel hub 31 which is freely mounted on a transverse shaft 33, rearwardly projecting from the wheel fork 25. Hence, the wheel hub 31, and its wheel 29, freely rotate in a direction of movement corresponding to either the forward or reverse direction of movement of the vehicle. The drive sprocket 3 causes the chain 1, which is guided directionally by the idler sprockets 9, 15 and 17, to come to rotate the slave sprocket 19 which then rotates the slave shaft 21 and its portions 23. The rotating slave shaft 21 and its portions 23 cause the wheel fork 25 to swing through a corresponding arcuate angle, thereby moving the wheel hub 31 and wheel 29 through a corresponding arc, the center of which is the vertical axis about which the slave shaft 21 and its portions 23 rotate.

Figure 2:
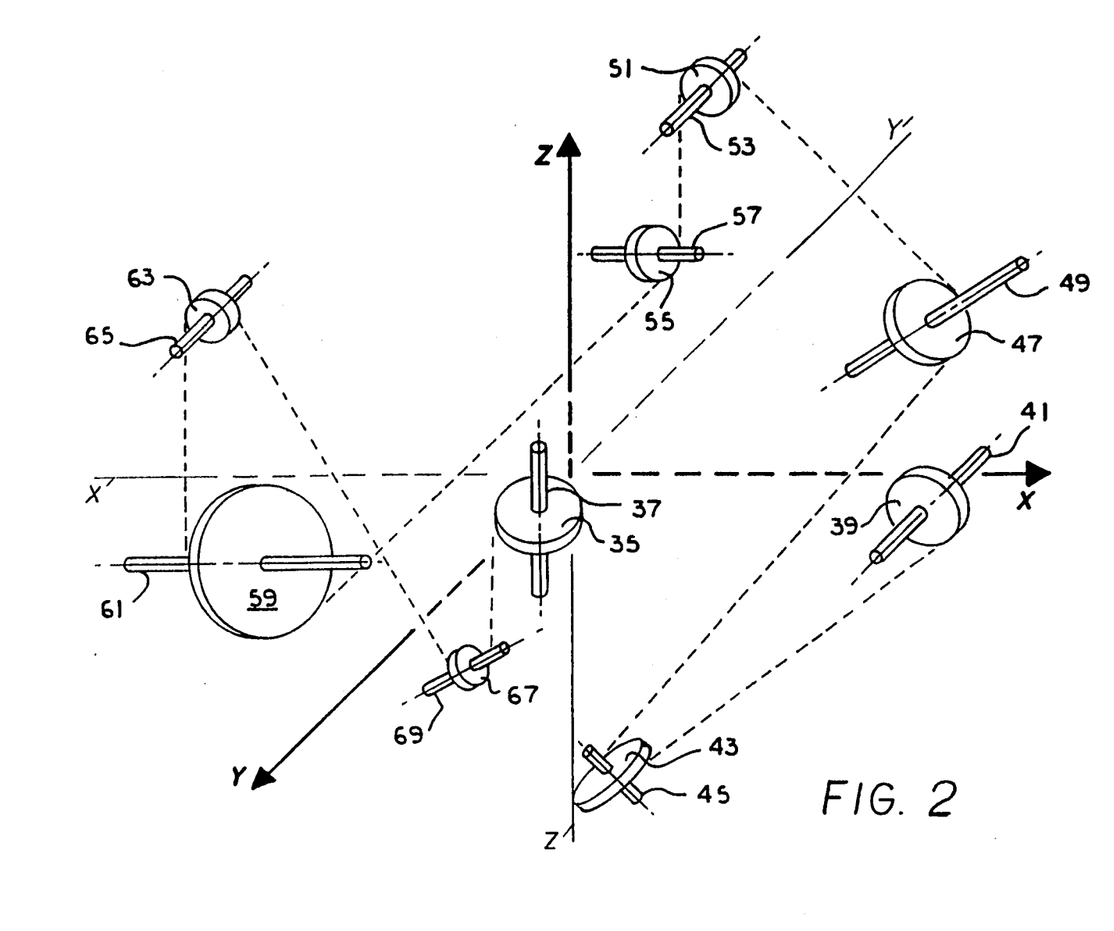
FIG. 2 depicts an Example of the multi-planar capabilities of the invention by specific reference to cartesian coordinates in space.

FIG. 2 is an example of the inclusive multi-planar capabilities of the invention, by specific references to cartesian coordinates in space, utilized and employed, in general, in analytic geometry, and in solid analytic geometry, in particular, with respect to the spatial positioning of a drive sprocket 35, relative to driven sprockets 39, 43, 47, 51, 55, 59, 63 and 67, afforded and made possible by the multi-directional capabilities of the drive chain 1 to dispose, with corresponding functional operations, the drive sprocket 35 and driven sprockets 39, 43, 47, 51, 55, 59, 63 and 67 not only in co-planar dispositions but also in other dispositions relative to one another. Inasmuch as the chain 1 runs on the X-axis in a positive direction and the chain 1 is coincidental with the X-axis, such coincidental portion of the chain 1 is not shown. The chain engages the driven sprocket 39 which lies substantially within the XZ'-plane. The chain 1 runs at an angle downwardly and towards the left, as shown, and engages the driven sprocket 43 which lies in a plane substantially parallel to the Y-axis; engages the driven sprocket 47 which is substantially co-planar with the Y'-axis; engages the driven sprocket 51 whose shaft is substantially parallel to the Y'-axis; engages the driven sprocket 55 which is substantially parallel to the Y'Z-plane; engages the driven sprocket 59 which is substantially parallel to the YZ-plane; engages the driven sprocket 63 whose shaft is substantially parallel to the Y-axis; and then engages the driven sprocket 67 which is substantially parallel to the Y-axis.

Figure 3:
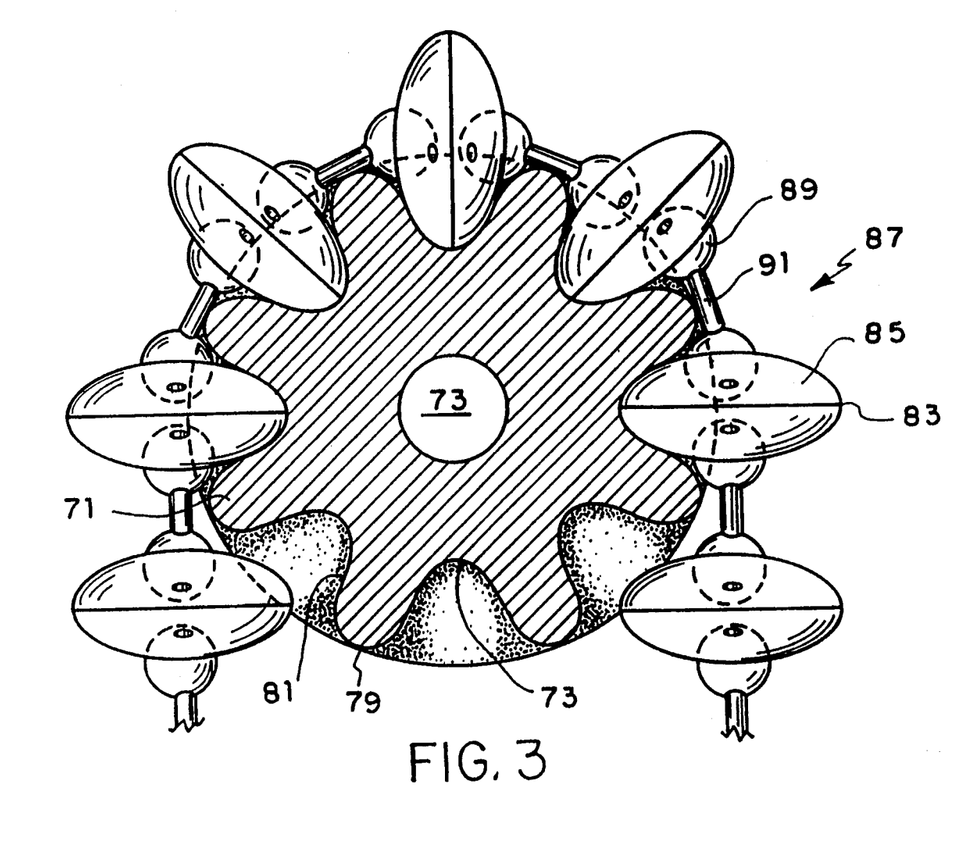
FIG. 3 is a front elevational view, partly in section, of an assembled chain, trained around and operatively engaging a representative sprocket.

FIG. 3 is a front elevational view of an assembled chain 1, trained around and operatively engaging a representative sprocket 71, concentrically mounted on a shaft 73. Each sprocket 71 has and defines valleys 77 and ridges 79. Slopes 81 are the surfaces between which each valley 77 end and each ridge 79 begins. Chain 1 comprises sets 83, each set 83 of which comprises two symmetrical shell halves 85 joined together in fixed relationship. Adjacent sets 83 are operatively connected by a link assembly 87. Each assembly 87 comprises two aligned spheres 89 fixedly connected by an aligned link 91.

Figure 14:
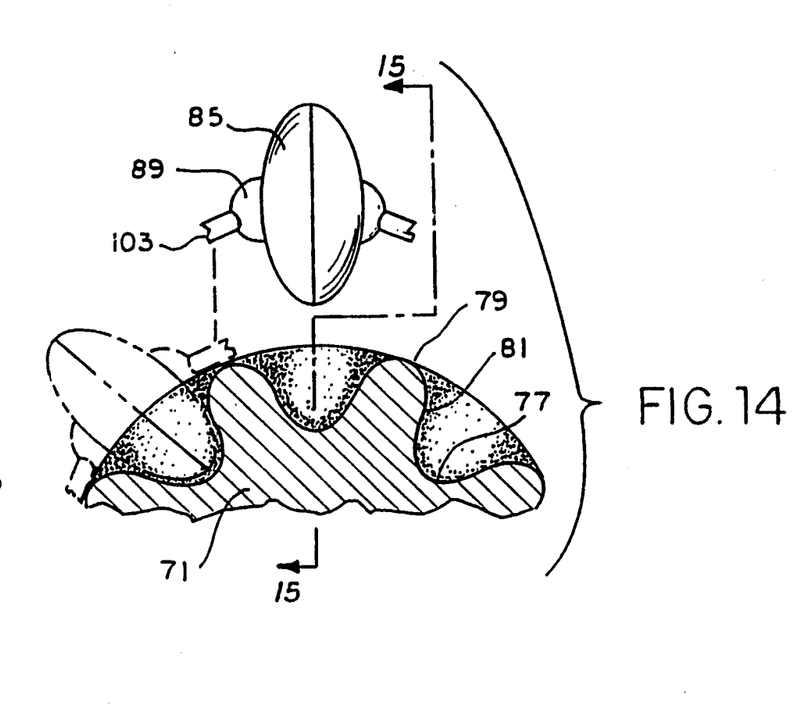
FIG. 14 is a partial exploded view of the top portion of FIG. 3, taken in the direction of the arrows 14—14 in FIG. 15.
Figures 15, 16:
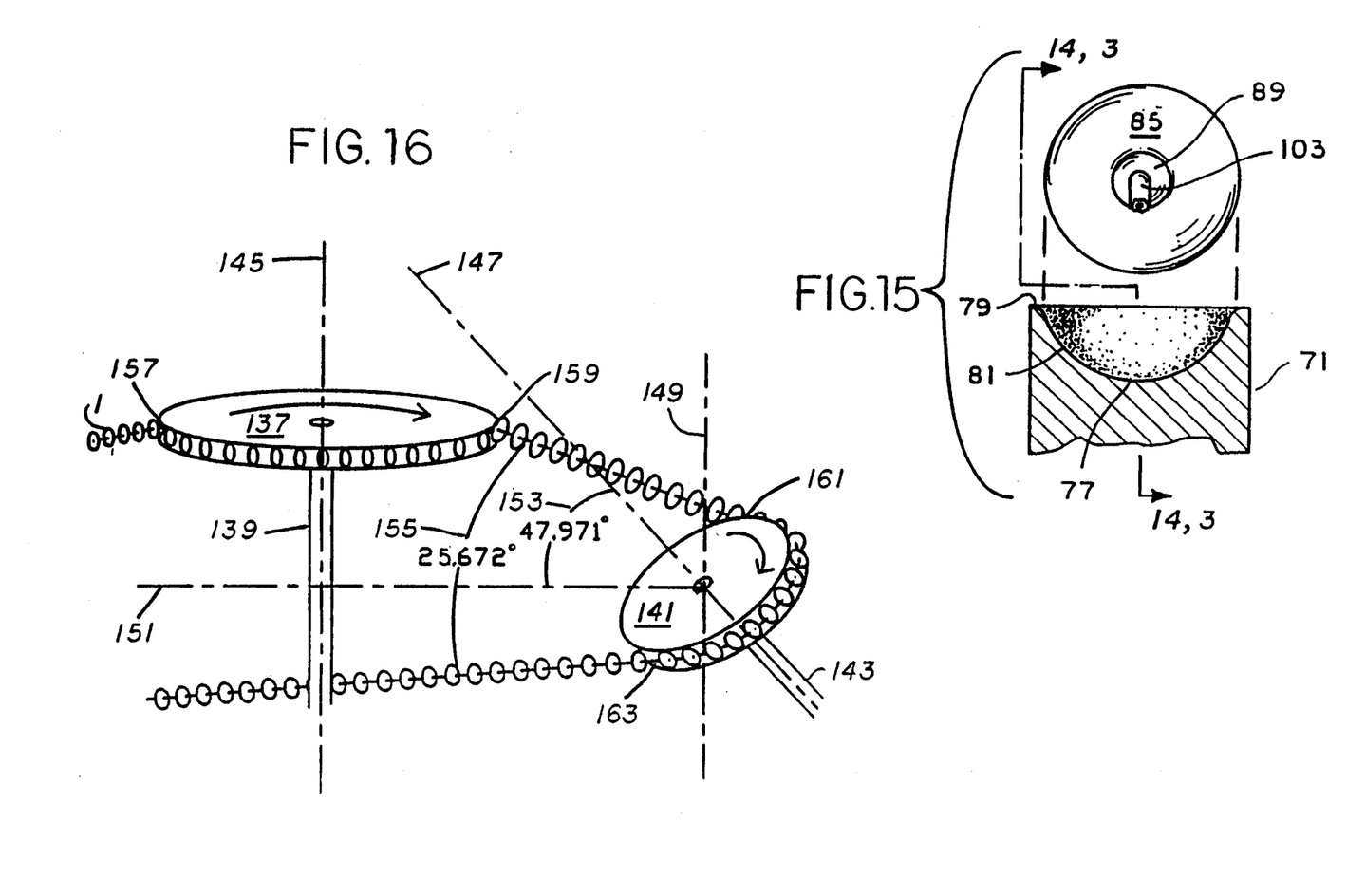
FIG. 15 is a sectional view, taken in the direction of the arrows 15—15 in FIG. 14.
FIG. 16 further depicts the multi-directional and multi-planar capabilities of the invention.

FIGS. 14 and 15 depict a portion of the chain 1, comprising a set 83 of its shell halves 85 and its link assemblies 87 preparatory to complemental engagement with the representative sprocket 71 which depicts the ridges 79, the valleys 77 and the slopes 81.

Figure 5:
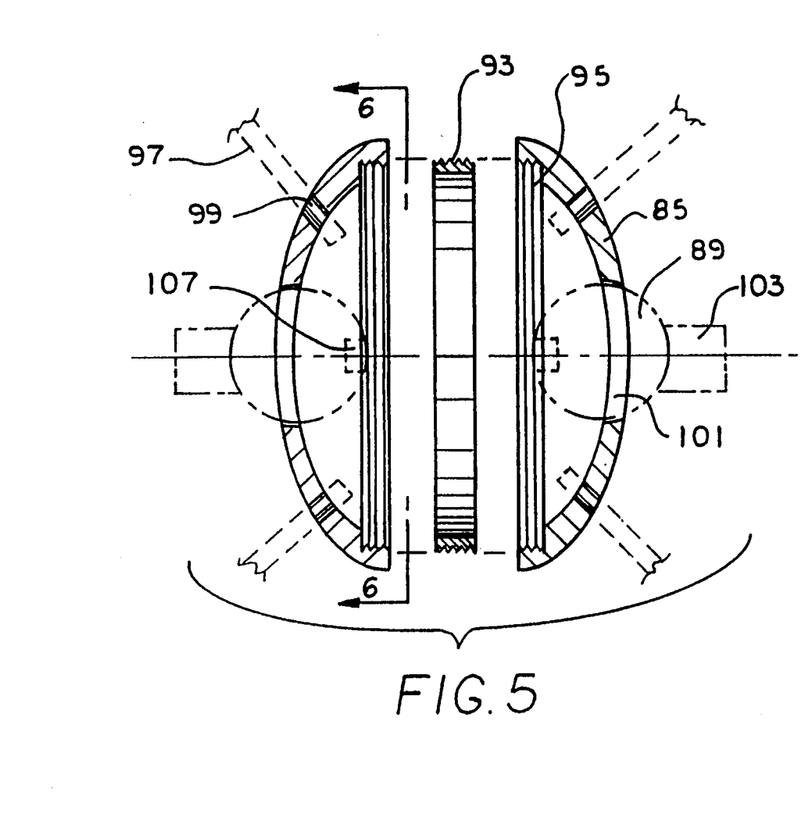
FIG. 5 shows an exploded view of the set of shell halves in cross-section.
Figure 6:
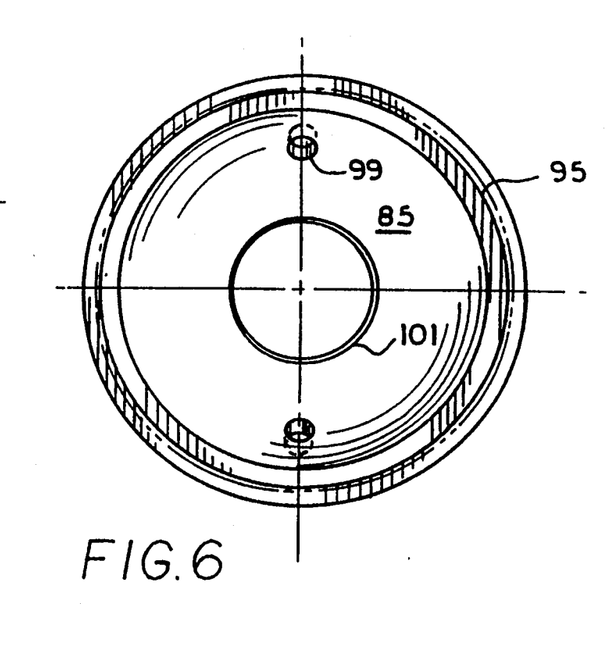
FIG. 6 shows a view taken in the direction of the arrows 6—6 in FIG. 5.

In FIG. 5, each set 83 of shell halves 85 is fixedly joined together via a male-threaded ring 93 engaged with female-threaded portions 95 of the shell halves 85; and, with such fixed assembly of the shell halves 85 being effectuated by disposing tool blanks 97 through and in engaged relationship with access holes 99 in the shell halves 85, and with appropriate rotation of the tool blanks in opposite directions. As inclusively shown in FIG. 6, each shell half 85 has a lip 101, functioning as a limit stop by complementally receiving a portion of its common sphere 89 in abutting relationship therewith.

Figure 4:
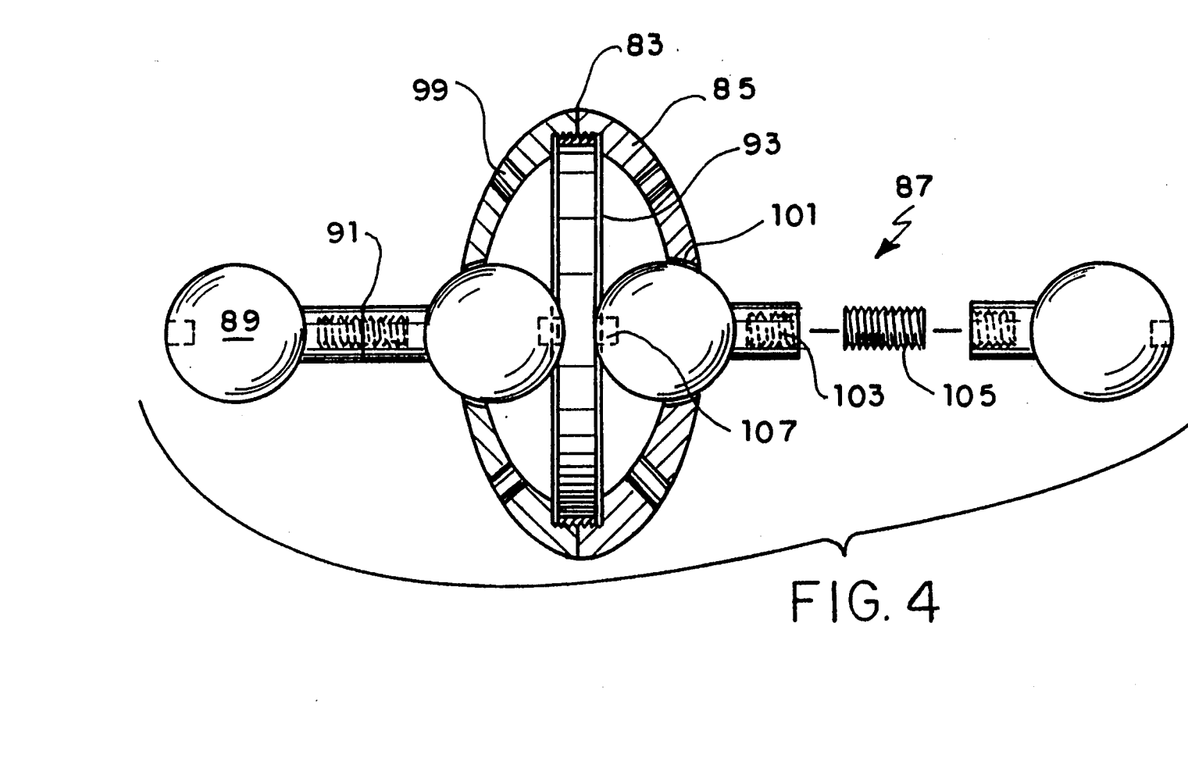
FIG. 4 shows a set of shell halves in cross-section, with the right link assembly in exploded view.
Figure 13:
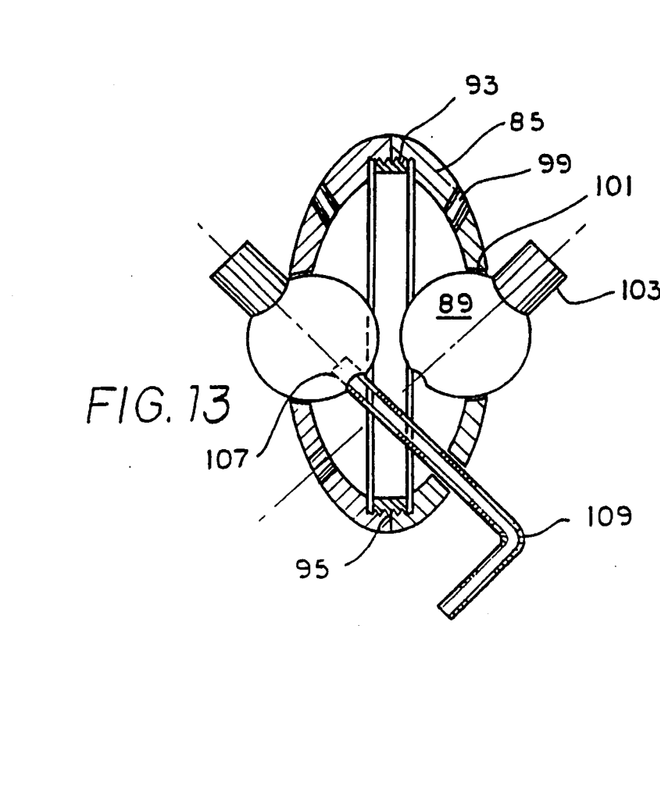
FIG. 13 is a cross-sectional view showing the adjustment feature of a link in FIG. 4 by means of an Allen wrench.

FIG. 4 shows the set 83 of shell halves 85 in cross section with the right link assembly 87 in exploded view. Integral with each sphere 89 and projecting therefrom is a female-threaded sleeve 103 threadingly engaged by a male-threaded element 105 to rectilinearly effect ajustment between their common spheres 89 of the link assembly 87 by appropriately rotating directionally either one or both of the spheres 89. With reference to FIG. 13, to effect such adjustment, each of the spheres 89 has formed and countersunk therein a depression 107 for complemental reception and engagement therewith by a correspondingly sized Allen wrench 109 to appropriately tighten or otherwise take up the slack of the chain 1 trained around and operatively engaged with the representative sprockets 71 of the transmission. Upon drive being transmitted to the chain 1, the lower portions of each set 83 of shell halves 85 complementally enter and positively engage their common valleys 77 without slippage and are subsequently released therefrom. This described vernier adjustment feature for the link assemblies 87 allows the chain 1 to be "fine tuned".

Figures 7, 8, 9:
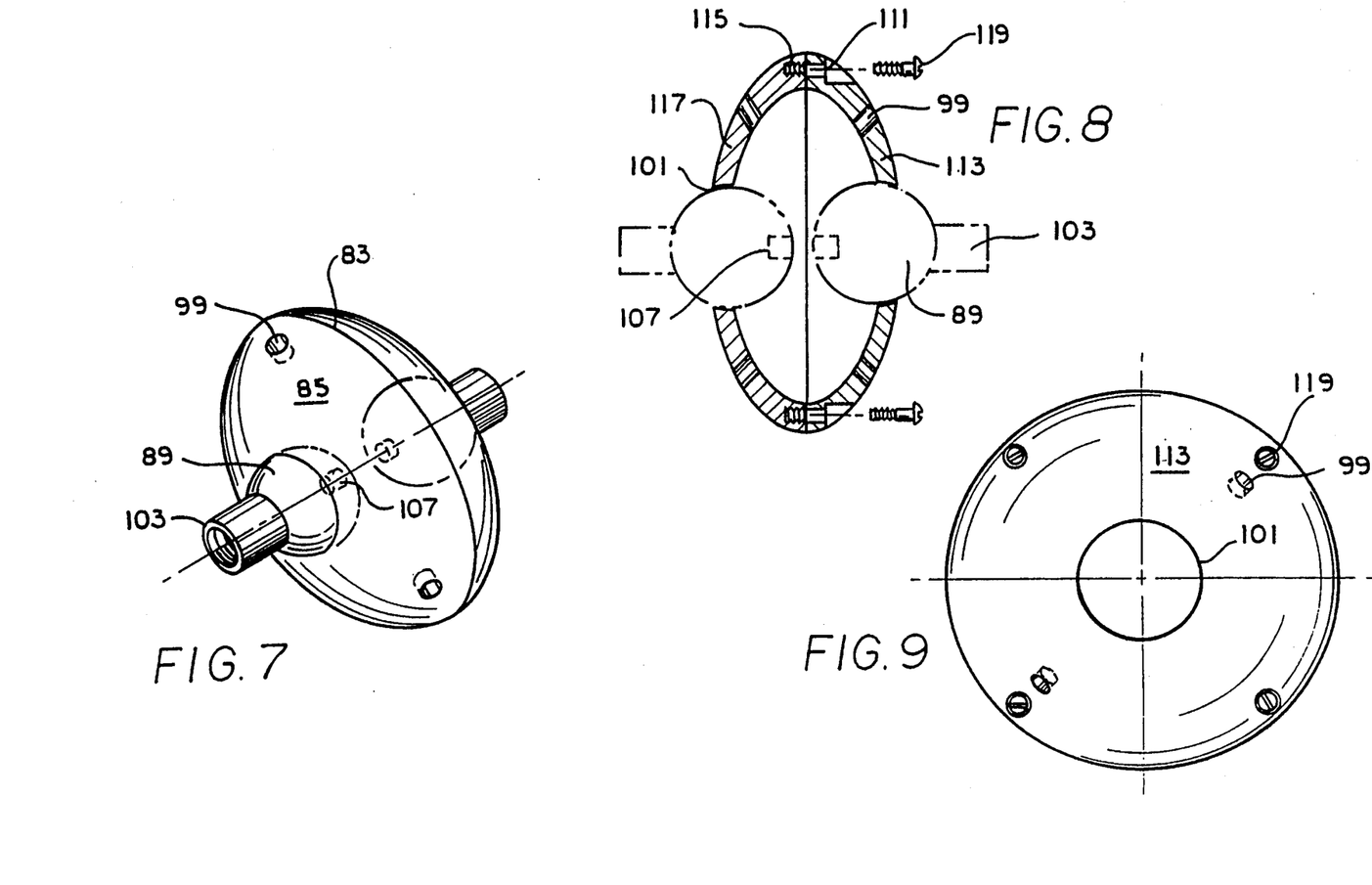
FIG. 7 is a perspective view of the set of shell halves in assembled relationship.
FIGS. 8 and 9 show a modification of the assembly of a set of shell halves.

In its assembled perspective view of the set 83 of shell halves 85, FIG. 7 depicts the spheres 89, the countersunk depressions 107, the female-threaded sleeves 103 and the access holes 99.

As shown in FIGS. 8 and 9, in lieu of the male-threaded ring 93 and the female-threaded portions 95 of the shell halves 85, a shouldered-out recess hole 111 is provided in the upper and lower portions of one shell half 113 and aligned tapped holes 115 formed in a common shell half 117 with screws 119 being disposed through the holes 111 and appropriately engaged with the tapped holes 115.

Figure 10:
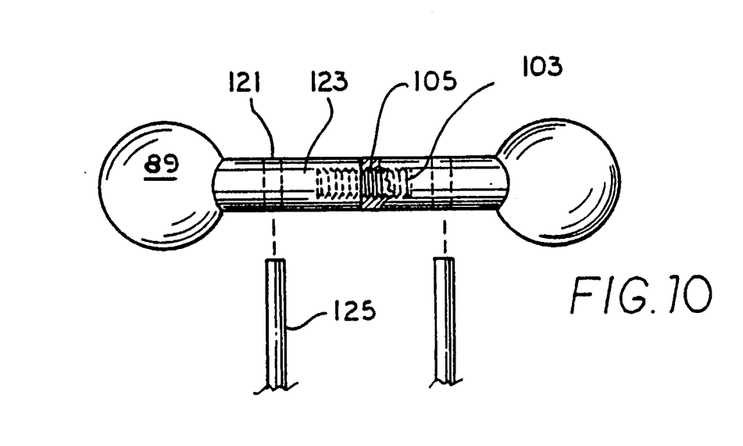
FIG. 10 shows a modification of a link for its assembly and adjustment.

As shown in FIG. 10, in lieu of the countersunk depressions in the spheres 89 for complemental reception and engagement therewith by an Allen wrench for purposes of adjustment, transverse holes 121 can be formed through rectilinearly aligned links 123 for disposition of tool blades 125 through such transverse holes 121 to rotatively effectuate requisite adjustment of the chain 1.

Figure 11:
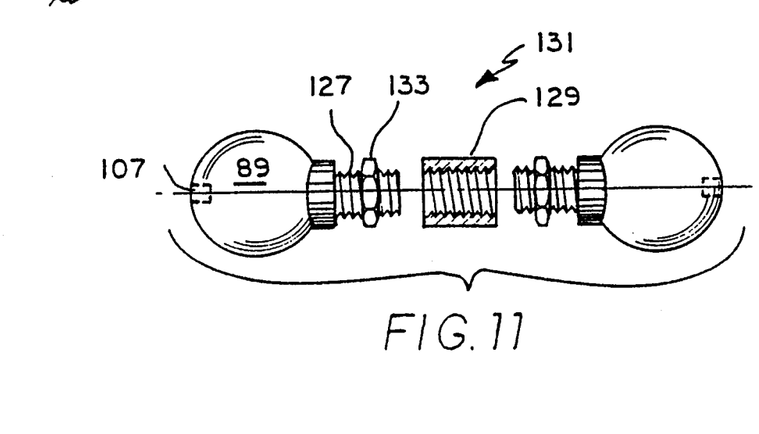
FIG. 11 shows another modification of a link for its assembly and adjustment.

As shown in FIG. 11, in lieu of the female-threaded sleeves 103 and male-threaded element 105, male-threaded elements 127, projecting from each of the spheres 89 could be utilized, in engagement with a female-threaded-sleeve 129 to effectuate requisite adjustment of the chain 1. Upon completion of such adjustment of a link assembly 131, locking nuts 133 carried on the male-threaded elements 127, as shown, can be lockingly tightened against the opposite ends of the female-threaded sleeve 129.

Figure 12:
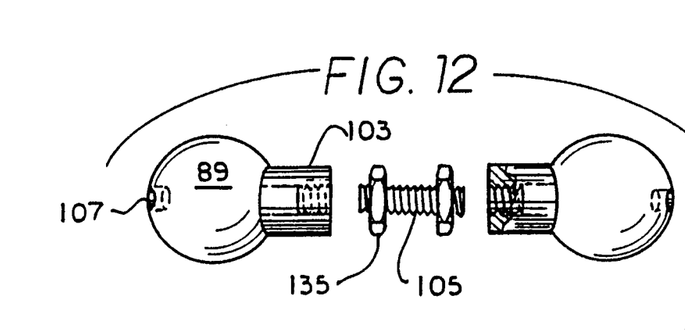
FIG. 12 shows another modification of a link for its assembly and adjustment.

FIG. 12 depicts a modification for the assembly and adjustment of the link assembly in that a male-threaded element 105 is threadingly engaged with female-threaded sleeves 103, projecting from the spheres 89, as shown. Locking nuts 135, engaged with the male-threaded element 105 and tightened against the edges of the female-threaded sleeves 103, allows length adjustment of the link assembly, and can be utilized as a counter-adjustment for the possible minimal wear of the lip 101 in the shell half 85 or the spheres 89.

FIG. 16 further depicts the multi-directional and multi-planar capabilities of the invention. Chain 1 is trained around and operatively engaged with a drive sprocket 137, fixed to its drive sprocket shaft 139; and trained around and operatively engaged with a driven sprocket 141, fixed to its driven sprocket shaft 143. An inmaginary directional reference line 145 is concentric with the axis of rotation of the drive sprocket shaft 139; and another imaginary directional reference line 145 is concentric with the axis of rotation of the driven sprocket shaft 143. Another imaginary directional reference line 149, parallel with directional reference line 145, intersects the directional reference line 147 at the center of the upper facing surface of the driven sprocket 141. An imaginary directional reference line 151, normal to the reference line 149 at its intersection with line 147, is extended leftward to, is normal to and intersects reference line 145. The inclusive angle of measurement 153 between the reference lines 147 and 151 is 47.971 degrees and indicates the negative angle of incidence of the plane of the driven sprocket 141 relative to the plane of the drive sprocket 137, as well as the corresponding angle of incidence of the driven shaft 143 relative to the drive shaft 139. The change of direction from chain 1, engaged with sprocket 141 and its disengagement from sprocket 141, measures a positive angle of 334.328 degrees and hence subtends, as a matter of expression, an angle of 25.672 degrees, as indicated by reference numeral 155. No representation is made that any part of FIG. 16, as depicted, is accurate, or that the indicated angular measurements 153 and 155 are accurate. Chain 1 moves downwardly and to the left, as shown. The entrance point of chain 1 and the exit point of chain 1 from sprocket 137 are indicated by respective reference numerals 157 and 159, and serve to locate where chain 1 engages with and disengages from sprocket 137, respectively. The entrance point of chain 1 to and the exit point of chain 1 from sprocket 141 are indicated by respective reference numerals 161 and 163, and serve to locate where chain 1 engages with and disengages from sprocket 141, respectively. The plane of rotation of the sprocket 141 is independent of the plane of rotation of the sprocket 137 because the disposition of the sprocket 141, and hence its plane of rotation, can be an arbitrary disposition as may be required; and, accordingly, the arbitrarily selected plane of rotation of the sprocket 141 relative to the plane of rotation of the sprocket 137 can range from 0 to 360 degrees. The foregoing holds true so long as the following three Rules are observed and complied with. Rule 1: The directional line of the chain 1 upon its disengagement from the drive sprocket 137 is the same directional line of the chain 1 upon its engagement with the driven sprocket 141. Rule 2: Such directional line of the chain 1 must lie both in the plane of the disengaging drive sprocket 137 and in the plane of the engaging driven sprocket 141. Rule 3: The directional line of the chain 1 must be such that the corresponding sets 83 of shell halves are in complemental engagements with the corresponding ridges 79 and valleys 77 of the drive sprocket 137 and driven sprocket 141 at the exit point 159 of the disengaging drive sprocket 137 and the entrance point 161 of the engaging driven sprocket 141. The foregoing described criteria would similarly apply with respect to a drive transmission incorporating an immediately succeeding second driven sprocket, or further incorporating succeeding driven sprocket(s) remaining. In such drive transmission, the criteria for the drive sprocket 137 would be transferred to and would apply to the driven sprocket 141, and the criteria for the driven sprocket 141 would be transferred to and would apply to the immediately succeeding second driven sprocket, etc. And for purposes of further description, the succeeding driven sprocket would be characterized as the third driven sprocket. Hence, the criteria for the driven sprocket 141 would be transferred to and would apply to the second driven sprocket, and the criteria for the second driven sprocket would be transferred to and would apply to the third driven sprocket. And for purposes of further clarification and elucidation, in FIG. 2, sprocket 39 would be characterized as a driven sprocket, sprocket 43 as an immediately succeeding second driven sprocket, sprocket 47 as a succeeding third driven sprocket remaining, sprocket 51 as a succeeding fourth driven sprocket remaining. sprocket 55 as a fifth driven sprocket remaining, sprocket 59 as a sixth driven sprocket remaining, sprocket 63 as a seventh driven sprocket remaining and sprocket 67 as an eight driven sprocket remaining. The angular measurement 155 can be any angle ranging from 0 to 180 degrees provided the following two Rules are complied with, and which apply to the interaction between the chain 1 and a single sprocket. Rule 1: The directional line of chain 1 upon its engagement, for example sprocket 141, with the driven sprocket 141 and the directional line of claim 1 upon its disengagement from the driven sprocket 141 must both lie in the same plane of the driven sprocket 141 with which chain 1 is engaging or from which chain 1 is disengaging. Rule 2: The directional line of the chain 1 must be such that the corresponding sets 83 of shell halves 85 must be in complemental engagements with the corresponding ridges 79 and valleys 77 of the drive sprocket 137 and driven sprocket 141, i.e., at the exit point 159 of the disengaging drive sprocket 137 and the entrance point 161 of the engaging driven sprocket 141. Such criteria would be transferred to and would apply similarly to the characterized second, third, fourth, fifth, sixth, seventh and eight driven sprockets in FIG. 2.

I claim:

1. A positive drive system having a chain trained around, operatively engaging and rotatably coupling drive and driven sprockets to transmit positive drive between the drive and driven sprockets, the chain comprising adjacent sets of symmetrical shell halves joined together in fixed relationship, each set of shell halves being operatively connected to immediately adjacent sets by link assemblies, each of which has two aligned spheres fixedly connected to an aligned link, each shell half having a lip, freely receiving one of the spheres and fuctioning as a limit by complementally receiving a portion of its sphere in common abutting relationship therewith, each of the sprockets having and defining valleys and ridges with sloped surfaces therebetween, each sloped surface defining the surface between which each valley ends and each ridge begins, each the shell halves of each set having lower portions complementally engaging the common valleys of the sprockets and being released therefrom upon drive being transmitted to the chain, the chain, as engaged with the sprockets, allowing dispositions of the sprockets in infinite relative planes of rotations ranging from 0 to 360 degrees.

2. A positive drive system in accordance with claim 1, wherein the chain has adjustment means to effect vernier and counter adjustments of the chain.

* * * * *

UNITED STATES PATENT AND TRADEMARK OFFICE
CERTIFICATE OF CORRECTION

PATENT NO. : 5,413,537
DATED : May 9, 1995
INVENTOR(S) : Hume

It is certified that error appears in the above-indentified patent and that said Letters Patent is hereby corrected as shown below:

Column 6, Claim 1, line 11, --stop-- has been inserted after "limit".

Column 6, Claim 1, line 16, --of-- has been inserted before "the shell".

Signed and Sealed this

Twentieth Day of February, 1996

Attest:

BRUCE LEHMAN

Attesting Officer

Commissioner of Patents and Trademarks